Patented Dec. 27, 1932

1,891,974

UNITED STATES PATENT OFFICE

FRANZ FISCHER, OF MULHEIM-ON-THE-RUHR, GERMANY

METHOD OF PURIFYING GASES

No Drawing. Application filed April 28, 1928, Serial No. 273,775, and in Germany May 5, 1927.

Numerous methods and combinations of methods have been proposed, to remove sulphuretted hydrogen from gases with formation of elementary sulphur. Only few oxidation means are known which are adapted for this purpose, as they mostly oxidize the sulphur directly to sulphuric acid, which is generally less valuable than the elementary sulphur.

It has been known that potassium ferricyanide can oxidize hydrogen sulphide under alkaline conditions, so that the potassium ferricyanide is converted into potassium ferrocyanide.

It has further been proposed to regenerate the potassium ferricyanide in a simple manner by various methods, for example with air under pressure (see "Berichte der Gesellschaft für Kohlentechnik", 1927, volume 2, page 105), but at the high temperature necessary for this purpose a considerable portion of the potassium ferricyanide was always destroyed.

In this and all other known methods the hydrogen of the sulphuretted hydrogen is lost, only the sulphur is eventually obtained.

The new method according to the invention consists in a combination of the oxidation of the sulphuretted hydrogen with potassium ferricyanide, and of the electrolytic regeneration, well-known in itself, of the potassium ferricyanide, a quantity of hydrogen, equivalent to the sulphur obtained, being obtained on the cathode. The recovery of the two components of the sulphuretted hydrogen existing in the gas to be purified, in the form of sulphur and of hydrogen, both in the elementary state, has never been realized by any of the hitherto proposed method combinations.

The elimination of the sulphuretted hydrogen by washing can be carried out at ordinary pressure or at increased pressure, atmospheric pressure being however sufficient in general; ordinary and higher temperatures may also be employed, the application of ordinary temperatures being generally sufficient.

*Example*

With the aid of a tower or of a revolving washing drum the sulphuretted hydrogen is removed from the gas by a solution of potassium ferricyanide in presence of alkali or alkaline reacting salts with oxidation to elementary light-yellow sulphur. The sulphur is then separated in any manner from the solution which has passed over entirely or partly into potassium ferrocyanide, the solution being then conducted through the anode space of an electrolytic cell, the potassium ferrocyanide converting thereby into potassium ferricyanide to be used again for washing out. The alkali produced on the cathode of the electrizing cell is added to the electrolytically regenerated potassium ferricyanide, the electrolytically generated hydrogen being added to the purified gas in which it occupies then the same space as originally occupied by the sulphuretted hydrogen.

Having now particularly described and ascertained the nature of my said invention, I declare that what I claim is:—

1. A continuous method of treating a gaseous mixture which contains hydrogen sulphide, which consists in treating said mixture with an alkaline solution of potassium ferricyanide, so that the potassium ferricyanide is converted to potassium ferrocyanide and sulphur is separated, removing the sulphur, then subjecting the solution containing the potassium ferrocyanide to electrolytic action so that the potassium ferrocyanide is regenerated into potassium ferricyanide and hydrogen is evolved, while adding to the regenerated solution of potassium ferricyanide the alkali which is produced by said electrolytic action.

2. A continuous method of treating a gaseous mixture which contains hydrogen sulphide, which consists in treating said mixture with an alkaline solution of potassium ferricyanide, so that the potassium ferricyanide is converted to potassium ferrocyanide and sulphur is separated, removing the sulphur, then subjecting the solution containing the potassium ferrocyanide to electrolytic action so that the potassium ferrocyanide is regenerated into potassium ferricyanide and hydrogen is evolved, adding said hydrogen to the purified gaseous mixture and adding to the regenerated solution of potassium ferricyanide the alkali which is produced by said electrolytic action.

In testimony whereof I have hereunto set my hand.

FRANZ FISCHER.